US005294214A

United States Patent [19]

Conner

[11] Patent Number: 5,294,214

[45] Date of Patent: Mar. 15, 1994

[54] GAS ELIMINATOR FOR OFFSHORE OIL TRANSFER PIPELINES

[75] Inventor: Stephen L. Conner, LaFayette, La.

[73] Assignee: Union Oil Company of California, Los Angeles, Calif.

[21] Appl. No.: 891,230

[22] Filed: May 29, 1992

[51] Int. Cl.[5] .................... F16L 1/00

[52] U.S. Cl. .................... 405/158; 405/195.1; 166/267

[58] Field of Search .................... 405/171, 173, 168.1, 405/158, 205, 195.1; 166/357, 267, 163; 210/740, 801, 120; 137/91, 101.25, 587

[56] References Cited

U.S. PATENT DOCUMENTS

| | | | |
|---|---|---|---|
| 4,133,181 | 1/1979 | Kotcharian | 405/171 X |
| 4,251,361 | 2/1981 | Grimsley | 166/357 X |
| 4,778,306 | 10/1988 | Anselmi et al. | 405/171 |
| 4,887,931 | 12/1989 | Frisby et al. | 405/171 |
| 4,982,794 | 1/1991 | Hovot | 166/267 X |

OTHER PUBLICATIONS

Armstrong Float Type Air and Gas Vents, Bulletin No. 451-A, Aug. 1990.

Armstrong Float Type Liquid Drainers, Bulletin No. 401E, 20M Nov. 1983.

*Primary Examiner*—Dennis L. Taylor
*Assistant Examiner*—J. Russell McBee
*Attorney, Agent, or Firm*—Gregory F. Wirzbicki; William O. Jacobson

[57] ABSTRACT

Large gas pockets in a crude oil transfer pipeline are detected and separated. As a large gas pocket forms, the liquid level drops (and the hydraulic head declines) in the export riser portion of the transfer pipeline, increasing the pressure required to transfer the fluid. Detection of the lower level and separation decreases the pressure required. Smaller gas pockets, which can be swept down the export riser portion, are not separated. The detecting and separating functions can be combined in a float-type gas vent valve, or separate gas detectors and gas vent valves can be used. The separated gas can be recombined with the crude oil, or used at an import platform, or separately transported to an on-shore facility. If the separated gas requires pressurization, a compressor-expander may be used to compress gas for flow in one direction and recover power from the expanding gas during flow in the other direction.

25 Claims, 3 Drawing Sheets

GAS ELIMINATOR FOR OFFSHORE OIL TRANSFER PIPELINES

FIELD OF THE INVENTION

This invention relates to oil and oil/water product and transfer devices and processes. More specifically, the invention is concerned with a device which reduces the pressure energy required to transfer produced fluids from an offshore platform to another platform or shore facilities.

BACKGROUND OF THE INVENTION

Offshore oil wells are typically drilled from offshore platforms anchored to the sea floor. Many wells produce oil or oil/water mixtures from an underground formation or reservoir without the need for pumping. Although the produced crude oil may be transferred from the offshore platform to tankers, a transfer pipeline is more commonly provided for moving the liquids to other platforms or shore facilities, e.g., for upgrading or refining. The export pipeline may directly transfer the oil to the shore facilities, or the produced oil may be transferred first to another platform, called an import platform, and then to the shore facilities from the import platform.

The transport pipeline normally comprises an export riser portion (e.g., extending from the outlet of the process equipment down towards the sea floor) and a transfer portion. The transfer portion typically extends along the sea floor from the lower end of the export riser to facilities on-shore or to an oil-importing platform. If the transport pipeline communicates to an importing platform, the pipeline also comprises an import riser extending from the transfer portion end up to the collection apparatus on the import platform.

Because the produced crude oil is frequently viscous and transfer distances may be long, transfer friction losses in the transfer pipeline (and associated backpressure) can be quite high. This increase in backpressure can inhibit the production performance of the well or require large and costly-to-operate transfer pumps. In addition, variable crude oil composition, temperature, and flowrates can also result in crude oil transfers over a wide range of supply, pipeline and outlet conditions, e.g. pressure and flowrate.

SUMMARY OF THE INVENTION

In the present invention it has been discovered that under certain pipeline conditions, e.g., off-design low flow and low pressure, a gas can break out and separate from the produced fluids, resulting in a gas pocket in the transfer pipeline. If a large enough gas pocket is allowed to form in the export riser portion, additional separating gas may be transferred, but backpressure on the upstream facilities increases dramatically. It has also been discovered that, although a gas pocket may not form under design conditions, the gas pocket formed under off-design conditions may not be removed when design conditions return. Detection of large gas pockets and separation of these pockets, even if the separated gas requires pressurization and injection downstream, results in a substantial reduction in the pressure required to transfer the fluids produced from an offshore platform. The reduced transfer pressure requirement on the producing wells normally results in increased production from these wells.

The present invention detects and separates large gas pockets in a produced fluid transfer pipeline. Smaller gas accumulations, e.g., bubbles, can be swept down the export riser portion and are not separated. The detecting and separating functions can be combined in a float-type gas vent valve attached at a high point on the export riser portion, or separate gas detectors and gas separators (e.g., a vent valve controlled by the gas detector) can be installed.

Separation may also be accomplished using a programmable controller actuating a control valve at the high point of the export riser based upon a plurality of sensor data. The valve/sensors/controller combination minimizes the loss of gas, further assuring that smaller gas pockets are not vented and the vapor quality of any vented gas is high.

The separated gas can also be recombined with the produced fluids, or separately transferred to an import platform or on-shore facilities, e.g., in a gas export pipeline. A tube can be placed within the transfer pipeline extending from the high point of the riser to the import platform (or on-shore facilities). As the liquid level drops (and the hydraulic head declines) in the export riser, the backpressure increases and the flowrate decreases to reduce the friction loss and compensate for the loss in hydraulic head. The decreased flow provides an increased pressure drop to transfer the gas pocket through the separate tube to near the import platform (or on-shore facility). Alternatively, the tube may be placed substantially parallel to, but outside the transfer pipeline until the gas is recombined.

The separated gas may also be separately pressurized by a simple liquid head compressor. Alternative pressurization means include rotary compressors and dual function expander-compressors. The expander function can be used if the transfer pipeline (and separately pressurized gas) is also used to import produced liquids to the platform.

The apparatus of the invention detects and separates large vapor pockets from a conduit transferring a produced hydrocarbon or hydrocarbon-water mixture fluid stream. The apparatus comprises a source of fluid which can supply fluid over a range of pressure and flowrate conditions; a first conduit section connected to the source, the first conduit having first cross-sectional flow area shape near the source sufficient to separate a substantial share of the vapor component in a high point portion of the first conduit section but not so large to prevent mixed phase flow under design conditions; and means for discharging vapor from the high point when a substantial amount of the vapor component is present near the high point.

BRIEF DESCRIPTION OF THE DRAWINGS

In these Figures, it is to be understood that like reference numerals refer to like elements or features.

DETAILED DESCRIPTION OF THE INVENTION

The present inventor has discovered that, under certain conditions, a gas phase "breaks out" or is evolved from crude oil in an export riser portion of a transfer pipeline, forming a gas pocket. The gas can "break out" even after a process step to remove (separated) gases. The separated gas is typically composed of lighter hydrocarbons, leaving a heavier, more viscous hydrocarbon liquid component. The separated gas continues to form a large unswept vapor pocket in the export riser portion under these conditions, eventually filling a substantial portion of the export riser. In addition to a single gas pocket near the top of the export riser, the gas filling may take the form of increasing amounts of gas bubbles rising through the downward flowing crude oil or produced hydrocarbon mixtures.

If crude oil stream conditions, such as pressure and flow velocity in the transfer pipeline, are great enough, only small gas pockets or bubbles form which can be swept down the export riser with the (fast-flowing and pressurized) liquid. The swept gas may also recombine or redissolve (under the increasing hydrostatic pressure near the sea floor) with the separated heavier liquid, reducing viscosity of the recombined mixture. Whether or not the small gas pockets/bubbles are swept down or a large gas pocket forms is a function of the shape and dimensions of the conduit as well as the fluid properties and conditions, such as flowrate and viscosity.

If a gas pocket forms, the effect of filling with this gas (having a density significantly less than the produced fluid mixture) is to reduce the hydrostatic head at the bottom of the export riser. The loss of hydrostatic head increases the pressure drop across the transfer pipeline that must be provided to move the produced fluids through the transfer pipeline to the import platform or shore facilities. Separating and removing the unswept gas pocket will increase the hydrostatic head and decrease the amount of additional pressure drop required.

The removed or vented gas may be used as a fuel, e.g., combusted in a natural gas engine, or the gas may be recombined with the heavier crude oil (e.g., separately pressurized and injected into the transfer pipeline at a downstream location), or it may be separately transferred in a separate conduit or pipeline (e.g., a gas export pipeline to an import platform or a shore installation). Recombining may be possible by changing the conditions of the produced hydrocarbon stream, such as increment flow and pressure, until the gas pocket is swept down the export riser. Alternatively, the gas may be separately conducted and injected into the transfer pipeline at a downstream location.

Figure 1:
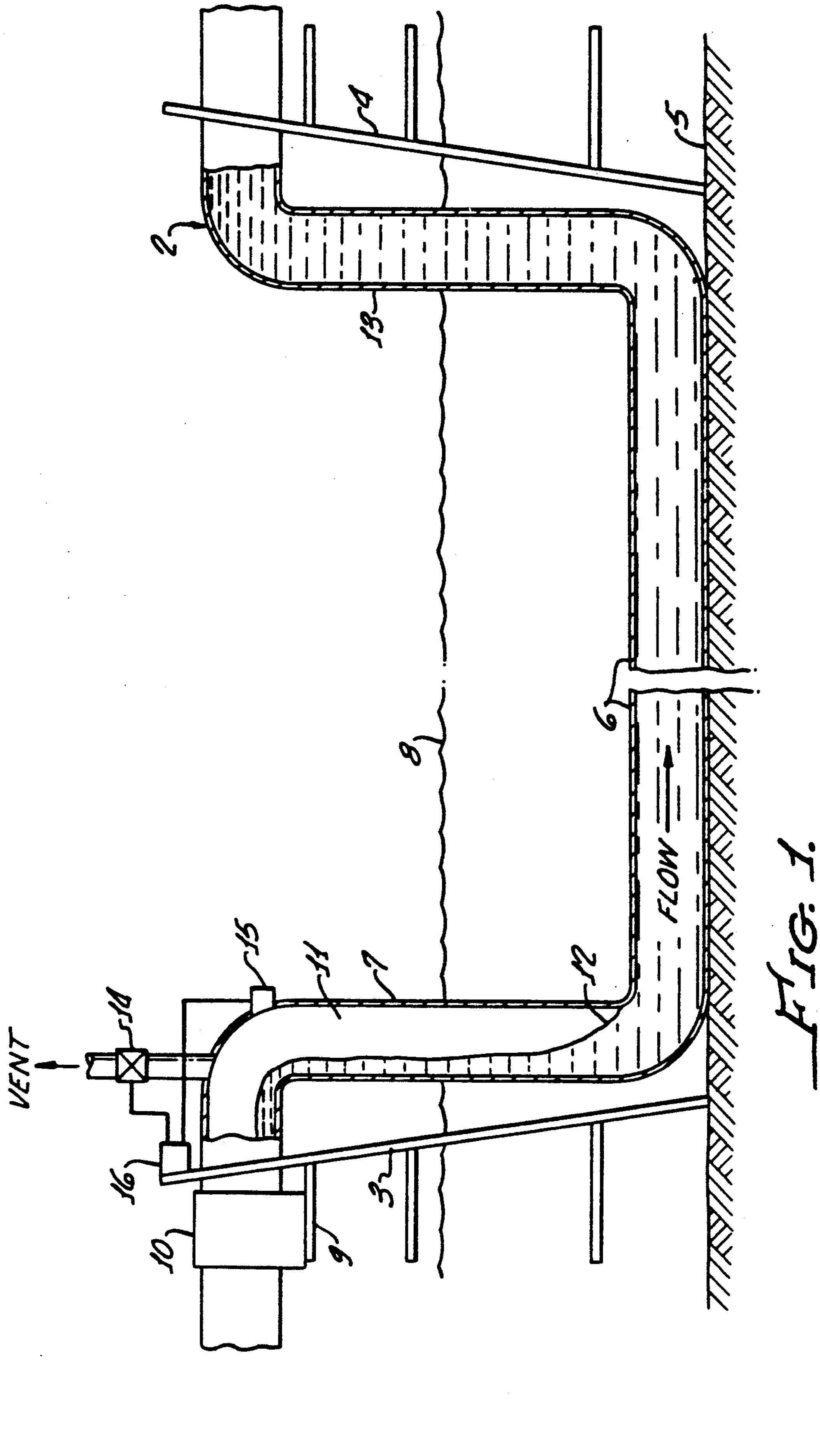
FIG. 1 shows a schematic of a gas venting embodiment.

FIG. 1 shows a transfer conduit or pipeline 2 (shown in section) which is venting a large gas pocket. The venting would not normally be to the atmosphere because of environmental limitations, but the vented gas typically would be used as a fuel, e.g., in a heater located on a platform. The transfer pipeline 2 connects an oil platform—or other substantially liquid hydrocarbon mixture-producing platform support structure 3—to an import platform structure 4. (Platforms 3 & 4 only shown in part for clarity.) Both platforms 3 and 4 are mostly below sea level 8 and are supported by and rest on sea floor 5, as does a transfer portion 6 of the transfer pipeline 2. The transfer portion 6 of pipeline 2 extends along the sea floor 5 from near the export platform 3 to near the import platform 4.

The transfer pipeline is sized and shaped to conduct the produced fluid mixture under design conditions, such as design temperature, pressure, and flowrate. Design conditions for initially produced fluids in a pipeline (i.e., without secondary or tertiary recovery methods) can typically range in temperature from 10° to 75° C. and in pressure from about 1 to 150 atm. These conditions result in a pipeline design which transfers the produced fluids at an average velocity from nearly zero to about 34 meters/minute, but more typically from about two to 20 meters/minute. For example, pipelines for initially transferring about 3000 barrels/day (87 gpm or 4.14 liters/sec) of a produced hydrocarbon fluid at a pressure of 100 psig (7.8 atm) and a temperature of 100° F. (38° C.) could require a conduit or pipeline having a nominal diameter ranging from about 2 1/2 to 8 inches (6.35 to 20.32 cm), but more commonly would be transferred in a pipeline having a nominal diameter ranging from about 4 to 6 inches (10.16 to 15.24 cm).

However, as inlet conditions (e.g., formation declines) and outlet conditioning (e.g., altered delivery requirements) change, the flowrate, pressure, and temperature of the fluid in the transfer pipeline also change, sometimes outside of design conditions, allowing a gas pocket to form. For example, if the flowrate in a 4 inch (10.16 cm) nominal diameter pipeline declines to about 19 gpm (1.2 liters/sec), it is estimated that a gas pocket will form in the export riser 7.

Flowrate and velocity seem to be especially critical to the formation of growing gas pockets in a downflowing riser portion 7 of a transfer pipeline 2. Typically, if the nominal velocity of crude oil in the transfer pipeline declines to less than about 34 feet/minute (10.36 meters/minute), the risk of producing gas pockets increases dramatically. When the velocity slows even further to about 17 feet/minute (5.18 meters/minute), the gas pockets are likely.

The export riser portion 7 of pipeline 2 extends from platform 9 of the platform 3 downward towards the transfer portion through the sea level 8. The upper end of the export riser portion 7 is attached to process equipment 10. The process equipment typically includes a separator which separates gas and delivers crude oil or other formation liquids under pressure to the transfer pipeline. If a separator is part of the process equipment, it provides a low velocity or settling space for a gas component to separate and the separated gas is vented (i.e., used for fuel) or separately transmitted (e.g., using a gas export pipeline). The process equipment 10 also typically controls flowrate and velocity of the produced fluids and the produced fluids are supplied to it by one or more wells (not shown for clarity) located on the export platform 3.

Even though gas has been separated at process equipment 10, a mostly gaseous pocket 11 is shown filling a substantial part of the export riser portion 7. The gaseous pocket is typically composed of lighter hydrocarbons which were dissolved or combined in the crude oil under high formation pressures, but continue to separate or break out of the crude oil under the (typically less-than-formation) pressures within the pipeline. The more buoyant gas tends to move upward, opposite to the flow of liquid crude oil in the export riser.

The ongoing separation or break out of gas from the produced fluids may occur quickly or more slowly. Dissolved gases may break out quickly as the pressure decreases from formation conditions to the boiling point of one or more lighter constituents, e.g., methane dissolved in crude oil. The gas break out may also occur more slowly for kinetically controlled reactions, releasing a mostly gas phase constituent. Although the gas constituent is typically composed of lighter hydrocarbons, such as methane, it may also comprise $H_2S$, $CO_2$, or other gaseous phase fluids under transport pipeline conditions. The gas pocket 11 may also comprise some liquid phase fluids, e.g., water in the form of droplets or mist.

The remaining portion of the export riser comprises a mostly liquid phase fluid 12, e.g. heavy hydrocarbons. The heavier hydrocarbons of the crude oil remaining after the lighter hydrocarbons and other gases have separated. The liquid 12 is shown flowing down one side of the export riser 7, but other types of two-phase flow conditions are also possible, such as annular flow or plug flow or bubble flow.

The export riser 7 is shown having a substantial fraction filled with the gas phase. This large fraction results in the pressure near the bottom of the export riser being nearly equal to the pressure near the top of the export riser 7 (less frictional losses).

The pressure near the bottom of the export riser 7 is substantially greater than the top when it is mostly filled with the liquid discharged from process equipment 10. A significant hydrostatic head is developed at the bottom of the export riser 7 because of the greater density (and weight) of the liquid above it (when compared to gas above it) in the export riser 7. In order to push the liquid 12 near the bottom of the export riser 7 through the transfer portion 6 and up an import riser 13 to platform 4 when a large gas pocket reduces the hydrostatic head at the bottom of the export riser 7, the gas and liquid pressure at the top of the export riser 7 must be increased or the pressure near platform 4 must be reduced.

If separated gas is carried to the transfer portion 6 (or breaks out from the liquid phase in the transfer portion), the separated gas is mostly swept through to the import riser 13. Gas is swept because of the essentially horizontal orientation of the transfer section, so that the gas-liquid density difference does not tend to move the gas opposite to the liquid flow direction. Although a slight uphill orientation is common, even if the orientation of the transfer portion 6 requires fluid flow slightly downhill, buoyant forces opposite to fluid flow are small. Thus, although FIG. 1 shows liquid filling the transfer portion 6, a portion of the fluid flowing in the transfer portion 6 (e.g., near the top) may include a separated gas phase being swept though the pipeline 2.

During fluid transfer through the pipeline 2 in the direction shown, the import riser 13 is not subject to the formation of large gas pockets. Any gas phase in the liquid 12 within the import riser 13 has buoyant forces tending to move the gas in the same (upward) direction as the liquid flow. Because of the essentially vertical orientation and lack of a large gas pocket, the pressure near the bottom of the import riser 13 is substantially less (by an amount equal to the hydrostatic head plus friction losses) than the pressure near the top of the import riser 13. The liquid from the export riser 13 is discharged to collection equipment (not shown on the drawing) for further processing or transfer, typically to shore installations.

In order to reduce the pressure difference across transfer pipeline 2 required to move the liquid through the transfer portion 6 and import riser 13, large gas pockets are removed through a control vent valve 14 in the embodiment shown, but a float valve may also be substituted for the vent valve 14. The vent valve 14 is mounted atop and fluidly connected to a high point on the export riser 7.

If a vent valve 14 is used, it can be actuated open when sensor 15 detects gas and an open signal is transmitted to an electrical or pneumatic controller 16. Valve actuation is controlled by the controller 16 which may also use other sensors or logic to determine when to actuate valve 14. The controller 16 may also be programmable.

The sensor 15 is located below the high point to detect large gas pockets only. As shown, the sensor 15 is located near the mid-point of a short horizontal section of the export riser so that a gas pocket must at least half fill the short horizontal section before gas is sensed (and the controller 16 opens the vent valve). As the venting continues and the short horizontal section becomes less than half full of gas, the sensor 15 detects liquid, and controller 16 closes the vent valve 14.

If a float valve replaces the vent valve 14 shown, a separate sensor 15 may not be needed. Gas would be vented as soon as the gas contact drops the "floated" valve open. As the gas pocket is vented and liquid returns to contact the float, the valve would be "floated" closed. A preferred embodiment uses a stainless steel ball float-type valve supplied by the Armstrong Company located in Three Rivers, Mich. Instead of being located at the high point, a float valve could alternatively be placed at the mid-point of the short horizontal section to actuate in a fashion similar to the above-described vent valve 14, sensor 15, and controller 16 combination.

Placement of the sensor 15 or the float of a float valve at a point other than the high-point of the export riser 7 can offer operational advantages. A below high-point location avoids potential loss of liquid and gas product when only small gas pockets (at the high point) are present. These small gas pockets would have been swept down the export riser 7 under design conditions and venting would only be wasteful. The below high-point placement of sensor 15 (or float valve) on the export riser 7 ranges from near the high-point to as much as 20 feet (6.10 meters) below the high-point, but more typically ranges from 2 to 3 feet (0.61 to 0.91 cm) below the high-point.

Placement of valve 14 or sensor 15 may also be on an added plenum located above the high-point of the export riser 7 (the plenum shown as the space between valve 14 and the top of the export riser 7). If the sensor remains as shown, the added plenum allows the liquid/-gas density differences in a gas-liquid mixture gas pocket to increase the vapor quality (i.e., percentage) of the gas vented, further reducing product loss, e.g., minimizing liquid droplet carryover in the vented gas. If the vented gas is used as a fuel in an internal combustion engine, the high vapor quality resulting from this above high-point location would minimize fuel handling problems (e.g., carburetor) and also minimize the risk of a liquid slug damaging the engine. Location above the high-point can range from near the high-point to as much as 20 feet (6.10 meters) above the high-point, but more typically ranges from 1 to 3 feet (0.30 to 0.91 meters) above the high-point.

Controller 16 can be also set to delay the opening of vent valve 14 to further increase vapor quality. If a gas (or gas and liquid) pocket is detected, vent valve 14 would only be opened by controller 16 if the pocket continued to be detected for a delay time period. Since the optimum delay time period varies with the shape, dimensions, and operating stream conditions, a resettable delay time period would be preferred. Delay times can range from about 1 to 60 seconds, but most likely would range from about 10 to 30 seconds. The time delay would further limit the loss of crude oil/natural gas product.

Even still further, if sensor 16 can detect vapor quality (gas fraction) in a two phase pocket, the opening and/or delay time period can be varied as a function of vapor quality. For example, a greater delay time period to vent a low vapor quality (i.e., a high liquid fraction) gas pocket would minimize loss of product. Since the optimum function of delay time period with vapor quality also varies with operating conditions, the function would also preferably be resettable. For example, a delay time function could linearly increase the time delay by the inverse of vapor quality expressed as a portion of unity. For example, a time delay period of 10 seconds for a 100 percent vapor quality pocket would be increased to about 11.1 seconds for a 90 percent vapor quality pocket (or 10 seconds×1/0.9).

A more complex control function (at controller 16) could also be dependent upon fluid flowrate or velocity data if sensor 15 (or other sensors) detects and transmits these signals. For example, the delay time period function might include design flowrate, which would be multiplied by the ratio of actual flowrate over design flowrate. Thus, venting would be further delayed at higher flowrates because the higher flowrates would tend to sweep gas pockets down the export riser 7.

Another alternative embodiment would have process equipment 10 (or other transfer pipeline equipment) also be controlled by controller 16. When a gas pocket is sensed by sensor 15 and a corresponding signal is transmitted to controller 16, the pressure or flowrate could be increased to try to redissolve or sweep the gas pocket. This could be combined with a time delay so that if the increased pressure/flowrate were ineffective in redissolving/sweeping the gas pocket over the time delay period, process equipment 10 could be returned to prior (lower pressure/flowrate) operating conditions and the gas pocket vented or recompressed as previously discussed.

Thus, the invention allows only venting when necessary to prevent large pressure increases (or large declines in flowrate), but prevents unnecessary separation, venting and loss of product. Controller 16 can be programmed to protect the transfer system from inadvertently venting during special conditions, such as start up, shutdown, storage, maintenance, inspection, and workover.

Figure 2:
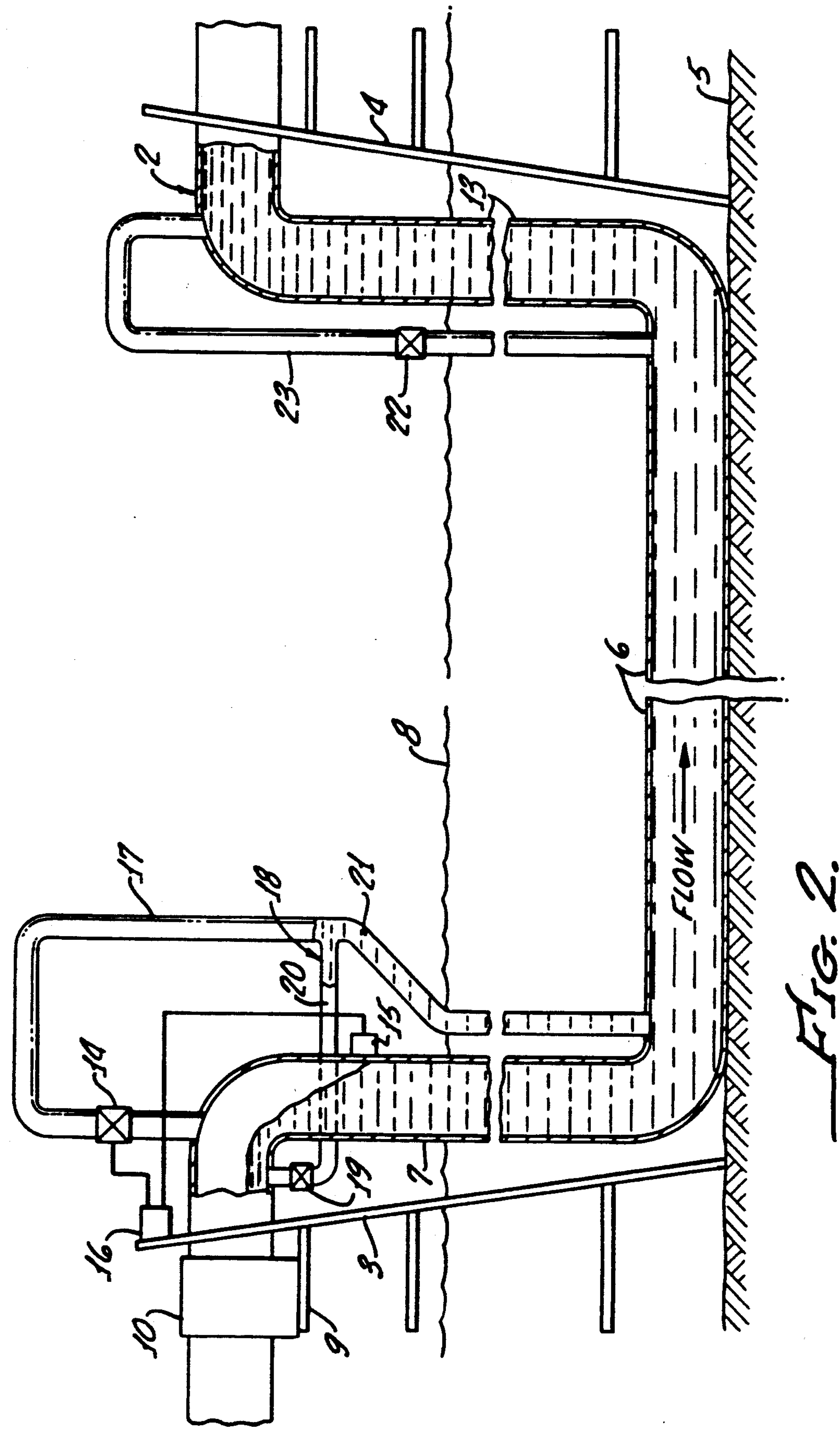
FIG. 2 shows a schematic of a gas pressurization embodiment.

FIG. 2 is a schematic showing an alternative embodiment where large gas pockets are separated and, instead of venting to be transmitted or used separately, are injected back into the transfer pipeline 2. Vent valve 14 is still controlled by controller 16 which receives data from sensor 15, but tubing 17 connects the discharge of vent valve 14 to a compressor device 18. The compressed gas is transmitted (through tubing 17) down to where it is injected into the transfer pipeline 2 at a position below sea level 8 where it can be safely carried by the fluids in the transfer pipeline to the import platform 4.

The compressor device 18 shown is a simple liquid head gas compressor, but other means for compressing may also be used, e.g., an electric-driven, rotary compressor. The compressor device 18 comprises a liquid control valve 19 and compressor tubing 20. The compressor tubing 20 is attached to the transfer pipeline at a tap (at the bottom of the short horizontal section of the export riser) and diverts a portion of the liquid hydrocarbon discharged from pump 10. The other end of the compressor tubing 20 is connected to tubing 17 at a location below the liquid tap and liquid control valve 19.

As the liquid level in the export riser 7 falls (i.e., as the gas pocket increases), gas is sensed by sensor 15, vent valve 14 is periodically opened and liquid control valve 19 is periodically closed. Periodic opening and closing of the liquid control valve 19 and vent valve 14 creates small gas bubbles 21 in the tubing 17. The small gas bubbles 21 are more easily carried down the smaller diameter tubing 17. The bubbles 21 are compressed during the downward travel by the increasing amount of liquid above the downward flowing bubbles. The location of sensor 15 and the diameter of tubing 17 are selected to create a two phase flow condition and a liquid flow velocity sufficient to sweep the gas bubbles 21 down the lower portion of tubing 17 to the transfer pipeline 2.

FIG. 2 also shows a gas compressor-expander 22 attached to import tubing 23 which parallels import riser 13 (similar to tubing 17 which parallels the export riser 7). Although the compressor-expander 22 functions as an expander in the flow direction shown, it can be used in place of compressor device 18 if flow is reversed. In the flow direction shown, the gas tends to collect at the top of transfer portion 6 and is collected in tubing 23 attached to the top of the transfer portion 6. The pressurized gas can generate power (e.g., to be used on platform 4) by expanding to a lower pressure across the compressor-expander. The expanded gas can be returned to the transfer pipeline 2 above sea level 8, because of the substantial reduction in pressure in the pipeline at the location shown. The expanded gas can also be used separately, e.g., as a fuel. The expander power can be used to drive a similar gas compressor-expander located near a corresponding riser section (not shown) delivering the crude oil from the import platform 4 to the shore.

Figure 3:
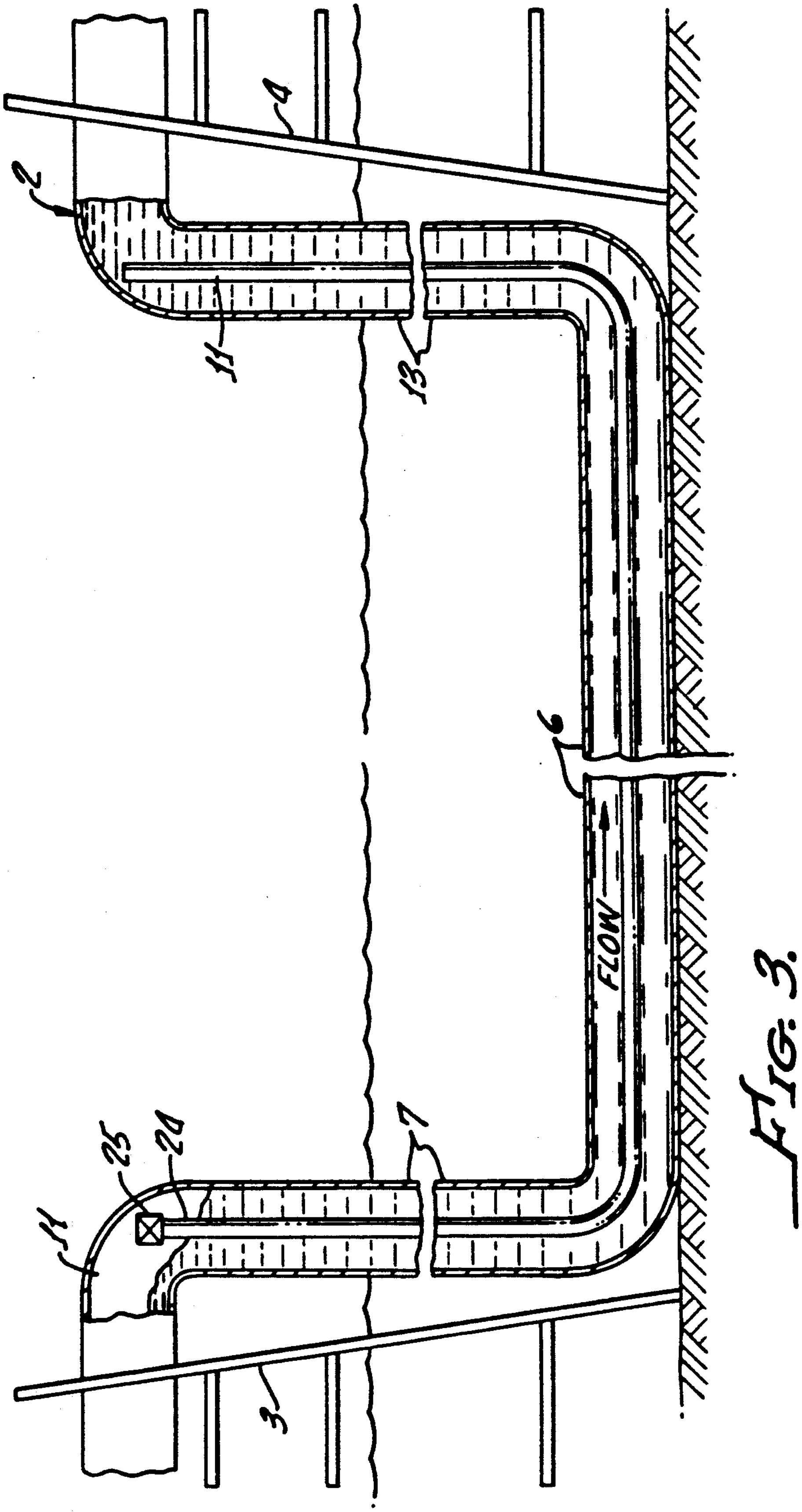
FIG. 3 shows a schematic of a gas transfer embodiment.

FIG. 3 shows a separate gas transfer system embodiment. A gas suction tube 24 is located so that one end protrudes into a gas pocket 11. The gas suction tube 24 extends from the gas pocket 11 to the other end located in the import riser 13. Both ends are typically at a similar elevation above sea level 8.

The gas suction tubing provides a separate path for gas to travel from one platform to another (or to shore) along the sea floor without the need to be separately pressurized to the high (hydrostatic) pressures near the sea floor 5. The similar elevation of the suction tube inlet and outlet and pressure losses due to overcoming the viscosity of the liquid crude oil in the transfer pipeline 2 provide a pressure difference to drive the gas from the pocket 11 to the import platform 4 without additional or separate pressurization.

A suction valve 25, which can be similar to the float valve described previously, is shown at the entrance to the gas suction tube 24. The suction valve 25 would close upon sensing liquid to assure that the upward leg of the suction tube within the import riser 13 will not fill with liquid, form a liquid trap, and prevent gas transfer. The suction valve 25 may also be similar to vent valve 14 actuated by a controller and sensor arrangement similar to that shown in FIG. 1.

The suction valve 25 may not be necessary if the import 13 end of the suction tube 24 is located substantially below the elevation of the export platform end and the resulting reduced pressure difference between tube ends prevents the gas from being transferred until the liquid level in the export riser is below the entrance. Another alternative to the suction valve 25 is a small drain or pump in the suction tube to drain accumulated liquids.

Still other alternative embodiments are possible. These include: other types of sensors (e.g., several gas quality and flowrate transducers) supplying data to controller 16 for controlling venting, recompression, or transfer based upon this plurality of data; having tubing 17 located within the export riser 7 to minimize heat transfer to the sea; extending tubing 17 along the transfer section 6 to connect directly with import tubing 23; connecting the tubing 17 to a high point upstream of the process equipment 10 instead of downstream of the process equipment 10; adding an expander to tubing 24 similar to the compressor-expander 22 shown in FIG. 2; and adding demisters to the separate gas tubes at the entry ports to further preclude liquid entrance.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. An apparatus for transferring a stream of fluid, wherein said fluid comprises a substantially hydrocarbon liquid component and a lighter component which tends to separate from said liquid component when said stream is under a first set of conditions, which apparatus comprises:

a source of said fluid capable of supplying a stream of said fluid under a range of stream conditions which includes said first set of conditions;

a conduit fluidly connected to said source, said conduit having a zone capable of accumulating a substantial amount of mostly-separated lighter component when said stream is at said first set of conditions within said conduit, said zone also being capable of preventing said lighter component from accumulating when said stream is at a second set of conditions within said source range;

a port located in said zone; and means for removing said mostly lighter component from said port when said zone is accumulating said mostly-separated lighter component.

2. The apparatus of claim 1 which also comprises:

means for blocking said port;

means for sensing said lighter component proximate to said port; an means for unblocking said port when said lighter component is sensed.

3. The apparatus of claim 2 which also comprises:

a substantially vertical second conduit fluidly connected at one end to the downstream end of said conduit, said second conduit having a shape large enough to allow a substantial portion of said lighter component separating from said stream to migrate to said zone at said first set of conditions within said second conduit, but not large enough to allow said migration at said second set of conditions;

means for measuring fluid pressure and flowrate conditions within one of said conduits; and second means for blocking said port when said measured pressure and flowrate is within said second set of conditions.

4. The apparatus of claim 3 which also comprises second means for removing said lighter component, said separation means fluidly connected downstream of said source of fluid and upstream of said conduit, wherein said second removing means removes from said fluid stream substantially all of said separated lighter component upstream of said conduit.

5. The apparatus of claim 4 wherein said means for blocking, means for sensing, and means for unblocking are integrated into a single assembly which comprises a float-type gas vent valve.

6. The apparatus of claim 4 which also comprises a controller controlling said means for blocking and said means for unblocking and wherein said means for blocking and said means for unblocking comprise a control vent valve controlled by said controller.

7. The apparatus of claim 6 wherein said means for sensing comprises a fluid phase detector and electrical transducer attached proximate to said port and electrically connected to said controller.

8. The apparatus of claim 6 which also comprises:

means for sensing pressure in said conduit; and means for sensing fluid flowrate in said conduit.

9. The apparatus of claim 8 wherein said pressure sensing means comprises a pressure transducer attached to said conduit and electrically connected to said controller.

10. The apparatus of claim 9 where said flowrate sensing means comprises a flowrate transducer attached to said conduit and electrically connected to said controller.

11. The apparatus of claim 10 wherein said conduits are attached to an offshore platform and form an export riser portion extending from said second separating means to a location near the sea floor.

12. The apparatus of claim 11 which also comprises a transfer portion attached at one end to said export portion and at the other end to an import riser portion, wherein said export, transfer, and import portions comprise a transfer pipeline for transferring crude oil to an import platform.

13. An apparatus for transferring a stream of fluid, wherein said fluid comprises a substantially hydrocarbon liquid component and a lighter component which tends to separate from said liquid component when said stream, which apparatus comprises:

a source of said fluid capable of supplying a stream of said fluid;

first means for removing most of said lighter component when separated from said fluid stream, said first removing means fluidly connected downstream of said source;

a conduit fluidly connected proximate to and downstream of said first removing means, said conduit having a high-point zone;

a port located in said high-point zone; and second means for removing said mostly lighter component from said port.

14. An apparatus for transferring a stream of fluid, wherein said fluid comprises a substantially hydrocarbon liquid component and a lighter component which tends to separate from said liquid component, which apparatus comprises:

a source of said fluid capable of supplying a stream of said fluid;

means for removing most of said lighter component when separated from said fluid stream, said removing means fluidly connected downstream of said source;

a conduit fluidly connected proximate to and downstream of said removing means, said conduit having a high point zone;

a port located in said zone capable of discharging said lighter component when separated from said fluid downstream of said removing means; and means for recombining a majority of said discharged lighter component with said fluid stream said recombining means absent a means for increasing the pressure of said discharged lighter component.

15. The apparatus of claim 14 wherein said means for recombining comprises a substantially open duct located substantially within said conduit and fluidly connecting said high-point zone to a location downstream of said high-point zone.

16. An apparatus for transferring a fluid stream, wherein said fluid comprises a substantially liquid component and a less dense component which tends to separate from said liquid component when said stream is under a first set of conditions, which apparatus comprises:

a source of said fluid capable of supplying a stream of said fluid under a range of stream conditions which includes said first condition;

a conduit fluidly connected to said source, said conduit having a zone capable of accumulating mostly separated less-dense component when said stream is at said first set of conditions within said conduit, said conduit also being capable of preventing said accumulating of said less-dense component when said stream is at a second set of conditions within said source range;

a port located in said zone; and means for removing said mostly less-dense component from said port when said zone is accumulating said less-dense component.

17. The apparatus of claim 16 which also comprises means for recombining said removed less-dense component to said liquid component within said conduit at a location downstream of said port.

18. The apparatus of claim 17 wherein said means for recombining comprises a second smaller conduit within said conduit in the absence of a means for pressurizing said removed less-dense component.

19. A method for transporting crude oil from a first offshore platform to a crude oil import facility which comprises:

separating a vapor component from said produced crude oil, producing a separated liquid;

introducing said separated liquid into a conduit that takes said separated liquid from a high point on said first offshore platform to a low point below sea level;

sensing whether a substantial pocket of vapor is present in said conduit near said high point; and discharging at least a portion of said vapor from said pocket to outside of said conduit if a substantial pocket is sensed and transporting within said conduit at least a portion of said vapor to said low point if less than a substantial portion is sensed.

20. The method of claim 19 which also comprises the steps of: mixing said discharged vapor with said separated liquid downstream of said low point; and transporting the mixture to another offshore platform.

21. The method of claim 20 which also comprises the steps of:

compressing said discharged vapor; and expanding said compressed vapor prior to said mixing step.

22. The method of claim 21 wherein said separated liquid is at a temperature ranging from about 10° to 75° C. and a pressure ranging from about 1 to 150 atm, and said liquid is flowing in said conduit at an average velocity ranging from about 0 to 10.4 meters/minute.

23. A method for transporting a fluid in a conduit, wherein said fluid comprises a substantially liquid component and a less dense component substantially mixed with said liquid component, wherein said less dense component tends to separate as a vapor when said fluid is within said conduit under a first set of conditions leaving a separated liquid, and said fluid tends to remain a mixed-phase fluid under a second set of conditions, which method comprises:

supplying said fluid at said first set of conditions into said conduit;

transporting substantially all of said mixed-phase fluid from one end of said conduit to the other;

supplying said fluid at said second set of conditions into said conduit;

separating said less dense component from said liquid component within said conduit; and transporting substantially all of said separated liquid from one end of said conduit to the other.

24. A method for transporting a fluid stream, wherein said fluid comprises a substantially liquid component and a less dense component substantially mixed with said liquid component, wherein said less dense component tends to separate from said liquid component under a first set of conditions and tends to remain mixed under a second set of conditions which method comprises:

supplying a stream of said fluid to a means for removing a first portion of less dense component from said liquid component, producing a first lighter stream and a separated liquid stream;

discharging said separated liquid stream to a conduit;

separating said second portion of said less dense component from said separated liquid stream within said conduit under said first set of conditions; and transporting said second portion mixed with said separated liquid within said conduit under said second set of conditions.

25. The method of claim 24 which also comprises the step of recombining said second portion with said separated liquid stream within said conduit.

* * * * *